A. Betteley,
Elevator.
Nº 24,188. Patented May 31, 1859.
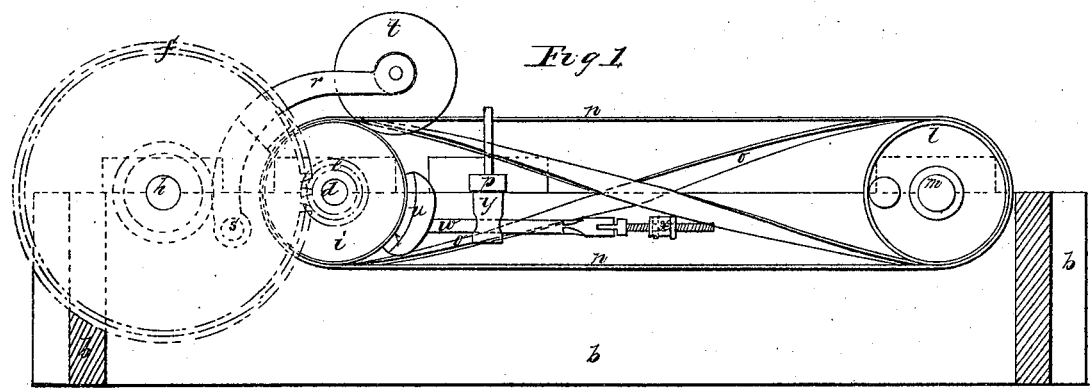
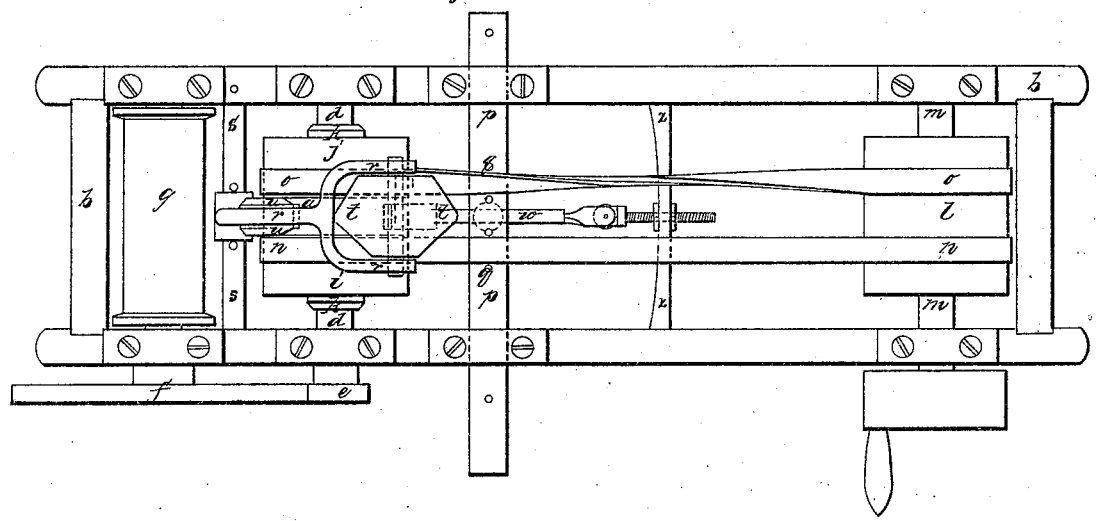
Witnesses
J. B. Crosby
W. B. Gleason
Inventor,
Albert Betteley.

UNITED STATES PATENT OFFICE.

ALBERT BETTELEY, OF BOSTON, MASSACHUSETTS.

ELEVATOR FOR HOISTING GOODS IN WAREHOUSES, &c.

Specification of Letters Patent No. 24,188, dated May 31, 1859.

*To all whom it may concern:*

Be it known that I, ALBERT BETTELEY, of the city of Boston, in the county of Suffolk and State of Massachusetts, have invented a new safety apparatus or automatic device to guard against such accidents as are liable to occur when belts break or are displaced or run off from their drums or pulleys, which is particularly applicable to elevators used for raising and lowering persons and goods in factories, stores, hotels, &c., and wherever the stress upon any machinery is such that reverse rotation of the gearing will follow the breaking or displacement of the belting; and I do hereby declare that the following, taken in connection with the drawings which accompany and form part of this specification, is a description thereof so full and exact as to enable those skilled in the art to which it appertains, to practice my invention.

Figure 1 is a sectional elevation, one of the sides of the frame being removed to show construction, and Fig. 2 is a plan.

Both figures illustrate my invention, and similar letters refer to similar parts in each.

The object of my invention is to provide automatically against accidents of a certain nature which are liable to occur upon the breakage, or running off, of belts.

The class of accidents to which I refer are liable to occur where a weight is dependent upon the integrity of a belt, or upon its keeping its position upon its pulleys or drums; for if the belt breaks, or comes off from either the driving or the driven pulley, the weight, if sufficient to overcome the friction of the machinery, must fall.

The invention is applicable where elevators are used in factories for raising and lowering persons and goods, also in warehouses, hotels, &c., in mine shafts, and generally wherever the stress upon machinery would cause reverse motion consequent upon the before mentioned derangements of driving belts.

The nature of my invention consists, first: in so arranging and combining with a riding, or binding, or tightening, roll, and with the frame or lever connected with such a roll, a brake, which is kept off from a pulley or drum which is driven by a belt, by the riding of the binding roll on the belt, and which will fall upon the driven pulley when the belt breaks, or when it runs off from the driven pulley, or materially out of its path. Second: in the arrangement and combination of such a tightening roll, and brake, with the well known arrangement of tight and loose pulleys driven in reverse rotations by any of the well known arrangements of belts.

The pulley ($a$) is fixed on the shaft ($d$), as is also the pinion ($e$), meshing into the gear ($f$), which, and the windlass ($g$), is fixed on the shaft ($h$) so that any rotation of ($a$) will cause the windlass to revolve. The pulleys ($i$) and ($j$) are arranged on each side of, and close to, ($a$), so that they can revolve freely around the shaft ($d$), and are kept in place on the shaft by the collars ($k$). The drum ($l$) is fast on the driving shaft ($m$) and carries the open belt ($n$) and cross belt ($o$); any rotation therefore of the shaft ($m$) will rotate the pulleys ($i$) and ($j$) in contrary directions. The bar ($p$) carries the shipper pins ($q$), and is made to slide in bearings in the frame ($b$) which also supports suitable bearings for the shafts ($h$), ($d$) and ($m$); it is evident that endwise movement of the shipper bar ($p$) will cause ($o$) or ($n$) to run upon and rotate ($a$) in one or the other direction. The lever ($r$) is hung by one end upon the shaft ($s$) fixed to the frame ($b$) as a fulcrum, and bears at the other end the roll ($t$). A belt passing over ($l$) and ($a$) and under ($t$), it is obvious, will rotate the roll and will keep it and any attachments upon ($r$) from bearing upon ($a$). The brake ($u$) is fixed upon ($r$) and shaped to correspond to the curvature of ($a$) when bearing upon the pulley, which it is obvious ($w$) would do if the belt should break, or be in any other way removed from off the pulley ($a$). The amount of resistance which the brake would afford to the rotation of ($a$) when bearing upon it, would depend upon the amount of leverage and weight brought to bear upon the brake.

In the particular instance of the application of my invention illustrated by the drawings, the roll ($t$) is tapered toward both ends to permit the side or shipping movement of the belts ($n$) and ($o$) under the roll ($t$) by which the brake is raised off from the pulley ($a$) leaving it free to rotate. The rider ($t$) may be made, if desired, of a number of rolls, or it may be made without rotating bearing surface upon the belt. This is designed to fill the place of the brake arrangement now in common use, and which is illustrated in the drawings and hereinafter described, as well as the first or safety function of the invention. The common brake is $(v)$, connected by a hinged bar $(w)$, and means of adjustment, to a spring bar $(x)$. A projection $(y)$ from the shipper bar $(p)$ supports $(v)$ and causes it to partake of any movement of $(p)$. As $(v)$ moves in the arc of a circle it is evident that it will bear most forcibly upon $(a)$ when its face is tangential to $(v)$, and that as $(v)$ is moved from the position it retreats from the faces of the driven pulleys. This apparatus is effectual in holding and controlling heavy weights, as has been repeatedly proved in practice where it has been applied to elevators for warehouses where heavy goods, sugars, &c., are elevated to, and stored in, upper stories; sufficient attention, of course, being paid to multiplying the leverage between $(a)$ and $(g)$. But it is true of it, that if either of the belts, $(n)$ or $(o)$, was upon $(a)$—the brake in this case being off from $(a)$—and should be ruptured, the weight being raised or lowered would then be free from control, and the results, which would depend upon the circumstances, might be frightful.

In my arrangement of the brake $(u)$, if a belt should be ruptured while upon $(a)$, it would act instantly to check any rotation of $(a)$. In the drawings the brake $(u)$ is represented as acting upon $(a)$.

No arrangement of power, leverage, or weight, can be given as a rule for guidance in the application of my invention; they will vary in accordance with the requirements of every case, and may safely be left to those skilled in the art, and many modifications of my invention may be made without departing from its principles.

Having described my invention, what I claim therein as new, and desire to secure by Letters Patent of the United States is:

So arranging and combining a rider $(t)$ with a brake, by the means described or their equivalents, as to operate upon a driven pulley to check or prevent its rotation whenever the driving belt breaks or is removed.

ALBERT BETTELEY.

Witnesses:
J. B. CROSBY,
W. B. GLEASON.